US009099853B2

(12) United States Patent
Jones et al.

(10) Patent No.: US 9,099,853 B2
(45) Date of Patent: Aug. 4, 2015

(54) CABLE-RIPPING TOOL

(75) Inventors: David Jones, Battle Ground, WA (US);
Steven Lingmann, Portland, OR (US);
Terry Lingmann, Oregon City, OR (US)

(73) Assignee: Feinteck LLC, Oregon City, OR (US)

( * ) Notice: Subject to any disclaimer, the term of this patent is extended or adjusted under 35 U.S.C. 154(b) by 577 days.

(21) Appl. No.: 13/157,224

(22) Filed: Jun. 9, 2011

(65) Prior Publication Data

US 2012/0311866 A1     Dec. 13, 2012

(51) Int. Cl.
*B26D 7/14*     (2006.01)
*H02G 1/12*     (2006.01)
*B65H 54/10*     (2006.01)
*B65H 75/28*     (2006.01)

(52) U.S. Cl.
CPC ........... *H02G 1/1217* (2013.01); *B65H 54/106* (2013.01); *B65H 75/28* (2013.01); *H02G 1/1239* (2013.01); *B65H 2701/34* (2013.01)

(58) Field of Classification Search
CPC ... H02G 1/1217; H02G 1/1239; B65H 75/28; B65H 54/106; B65H 2701/34
USPC .............. 83/13, 19; 30/90.1, 90.4; 225/3, 102
See application file for complete search history.

(56) References Cited

U.S. PATENT DOCUMENTS

| | | | | |
|---|---|---|---|---|
| 1,498,011 A | * | 6/1924 | Belz | 242/471 |
| 2,165,209 A | | 4/1937 | Baldanza | |
| 2,089,528 A | | 8/1937 | Barycz | |
| 2,121,510 A | * | 6/1938 | Rusler | 24/135 A |
| 2,313,793 A | * | 3/1943 | Wood | 81/9.42 |
| 2,643,561 A | * | 6/1953 | Ackley | 81/9.4 |
| 2,649,654 A | | 8/1953 | Carta | |
| 2,811,322 A | * | 10/1957 | Wilkinson | 242/586.1 |
| 2,830,366 A | * | 4/1958 | Chisena | 30/90.7 |
| 3,044,170 A | | 7/1962 | Agombar et al. | |
| 3,348,812 A | * | 10/1967 | Story | 254/223 |
| 3,722,092 A | | 3/1973 | Lukas | |
| 3,763,561 A | * | 10/1973 | Scharfenberger | 30/128 |
| 3,818,591 A | | 6/1974 | Peter | |
| 3,988,826 A | * | 11/1976 | Heikkala | 30/90.4 |
| 4,177,555 A | * | 12/1979 | Weltman et al. | 29/751 |
| 4,184,389 A | * | 1/1980 | Dvorak | 30/90.1 |
| 4,265,016 A | * | 5/1981 | Ducret | 30/90.8 |

(Continued)

OTHER PUBLICATIONS

Read, "Remarkable New Jacket Removal Tool!", Handline, Fall 2009, p. 11.

(Continued)

*Primary Examiner* — Sean Michalski
(74) *Attorney, Agent, or Firm* — Jared S. Goff; Goff Patent Law PLLC (57) ABSTRACT

A tool includes a spool, and a clamping assembly. The clamping assembly can include clamping members that are moveable relative to each other to clamp onto a clamped member between the two clamping members. One or more gripping members can be attached to the spool to hold a wire that is wound onto the spool. A driving mechanism can be attached to the spool. The driving mechanism can be configured to rotate the spool and wind the wire onto the spool. A cable-ripping tool can be clamped onto a cable. A portion of a wire from the cable can be gripped with a gripping member of the tool. This gripping can include moving the gripping member relative to a spool of the cable-ripping tool. The spool can be rotated so that the wire rips through a jacket of the cable and winds onto the spool.

20 Claims, 12 Drawing Sheets

(56) References Cited

U.S. PATENT DOCUMENTS

| | | | |
|---|---|---|---|
| 4,697,343 A | 10/1987 | Collins | |
| 4,715,549 A * | 12/1987 | Travlos | 242/470 |
| 4,753,007 A | 6/1988 | Weller | |
| 4,884,339 A | 12/1989 | Custin | |
| 5,093,992 A * | 3/1992 | Temple et al. | 30/90.8 |
| 5,542,327 A * | 8/1996 | Schultz | 83/861 |
| 5,771,586 A * | 6/1998 | Lotarski et al. | 30/293 |
| 5,806,188 A * | 9/1998 | Caraballo | 30/92.5 |
| 5,852,877 A * | 12/1998 | Lotarski et al. | 30/290 |
| 6,487,470 B1 * | 11/2002 | Sedlak | 700/97 |
| 7,103,978 B1 * | 9/2006 | Temple | 30/90.1 |
| 2001/0023542 A1 * | 9/2001 | Brant et al. | 30/347 |
| 2004/0128840 A1 * | 7/2004 | Proulx et al. | 30/276 |
| 2004/0237315 A1 * | 12/2004 | Alliss | 30/276 |
| 2005/0066528 A1 | 3/2005 | Ducret | |
| 2005/0077421 A1 * | 4/2005 | Hernandez et al. | 242/587.2 |
| 2007/0079511 A1 * | 4/2007 | Osypka | 30/90.1 |
| 2007/0089579 A1 * | 4/2007 | O'Neal | 83/13 |
| 2008/0010836 A1 * | 1/2008 | Iacona | 30/122 |
| 2008/0047147 A1 | 2/2008 | Ducret | |
| 2009/0101743 A1 * | 4/2009 | Chang | 242/385.2 |
| 2009/0139138 A1 * | 6/2009 | Agullo | 47/46 |
| 2009/0151166 A1 * | 6/2009 | Hartranft | 30/90.3 |
| 2011/0084159 A1 * | 4/2011 | Peng | 242/395 |
| 2011/0215182 A1 * | 9/2011 | Ryu et al. | 242/164 |
| 2012/0066913 A1 * | 3/2012 | Alliss et al. | 30/276 |

OTHER PUBLICATIONS

"Series 1100 Operating Instructions", Retrieved Mar. 10, 2011, 1 Page.
"Series 1100 Jacket Removal Tool", Retrieved Mar. 10, 2011, 1 Page.
"NW-15 15/25kV Neutral Winder", Retrieved Mar. 8, 2011, 1 Page.

* cited by examiner

FIG. 12

CABLE-RIPPING TOOL

BACKGROUND

Cables such as high voltage cables can have neutral wires that extend in a spiral pattern inside the outer jacket of the cable. Workers often separate a length of such neutral wires from the cable. For example, it may be desirable to connect the separated length of neutral wires to a neutral connection that is separate from connections for high voltage conducting wires within the cable. To separate the neutral wires, a worker typically grabs a neutral wire with pliers and pulls the wire relative to the body of the cable. With sufficient pulling force being applied to the neutral wire, the wire can rip through the cable jacket and separate from the remainder of the cable. Once one neutral wire has been ripped through the jacket, a worker can remove the ripped portion of the jacket to expose lengths of additional neutral wires that are running within that same portion of the jacket. These neutral wire lengths can be twisted together and connected to a neutral connection.

SUMMARY

The features of the cable-ripping tool and techniques for using a cable-ripping tool that are described herein can be used to assist in ripping wires such as neutral wires from cables. These features and techniques may be used alone or in combination.

According to one embodiment, a tool includes a spool and a clamping assembly connected to the spool. The clamping assembly can include clamping members that are moveable relative to each other to clamp onto a cable between the two clamping members. One or more gripping members can be attached to the spool and configured to hold a wire from the cable that is being wound onto the spool. A driving mechanism can also be attached to the spool. The driving mechanism can be configured to rotate the spool and wind the wire onto the spool.

According to another embodiment, a cable-ripping tool can be clamped onto a cable. A portion of a wire from the cable can be gripped with a gripping member of the tool. This gripping can include moving the gripping member relative to a spool of the cable-ripping tool. The spool can be rotated so that the wire rips through a jacket of the cable and winds onto the spool.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

The description and drawings may refer to the same or similar features in different drawings with the same reference numbers.

DETAILED DESCRIPTION

Following is a detailed description of features of a cable-ripping tool and techniques for using a cable-ripping tool. As will be discussed, the tool may be used to rip a neutral wire through a cable jacket by winding the neutral wire on a spool of the tool.

I. Cable-Ripping Tool Overview

Figure 1:
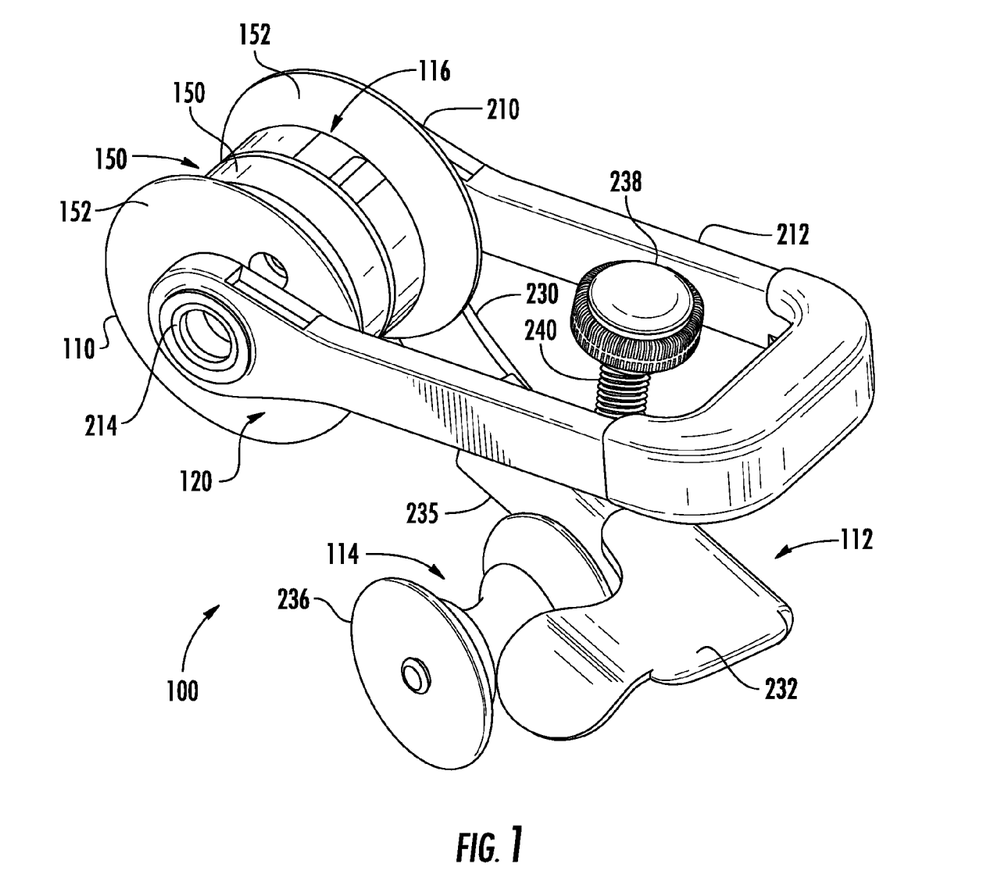
FIG. 1 is a front perspective view of a cable-ripping tool.

Referring to FIG. 1, an example of a cable-ripping tool (100) is illustrated. The tool (100) can include a spool (110). A clamping assembly (112) can be connected to the spool (110), and can include clamping members that are moveable relative to each other to clamp onto a cable (not shown in FIG. 1) to be ripped within a clamped region (114). One or more gripping members (116) can be attached to the spool (110) to hold a wire from the cable while the wire is being wound onto the spool (110). The tool (100) can also include a driving mechanism (120) attached to the spool. The driving mechanism (120) can be configured to rotate the spool (110) to wind wire onto the spool (110).

Figure 2:
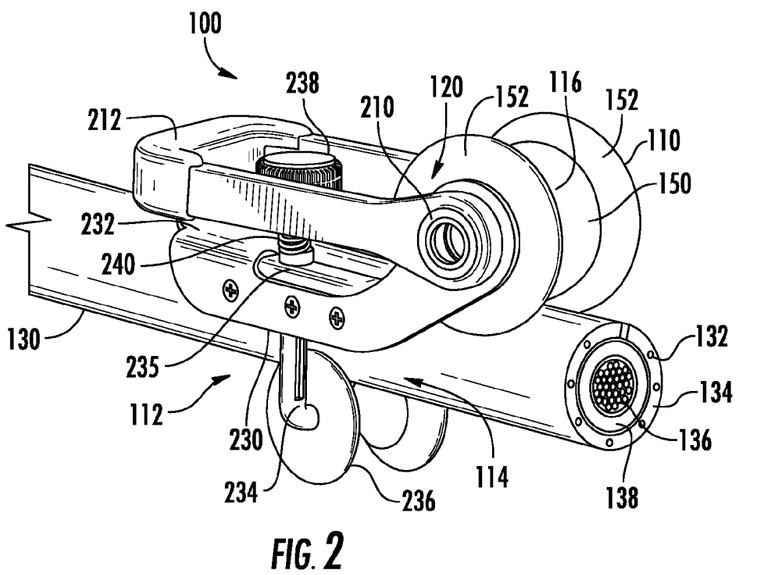
FIG. 2 is a rear perspective view of the cable-ripping tool of FIG. 1 mounted on a cable, with a portion of a neutral wire having been ripped through a cable jacket so that it can be gripped by the tool.
Figure 3:
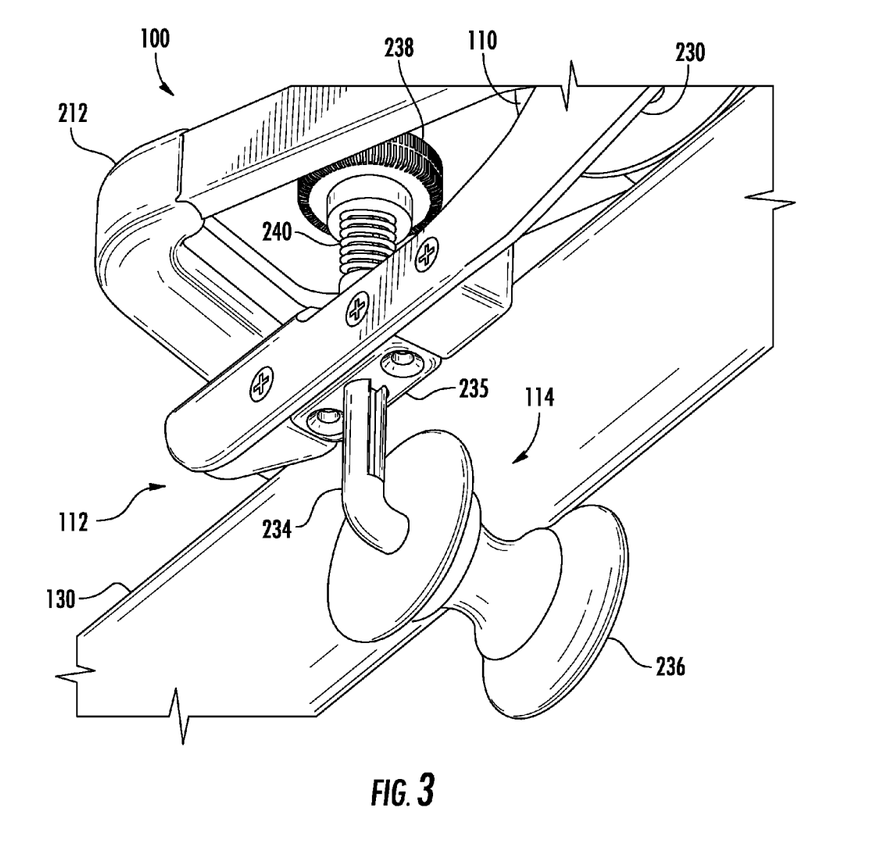
FIG. 3 is a broken-away bottom rear perspective view focused on a clamping assembly of the cable-ripping tool of FIGS. 1-2.
Figure 4:
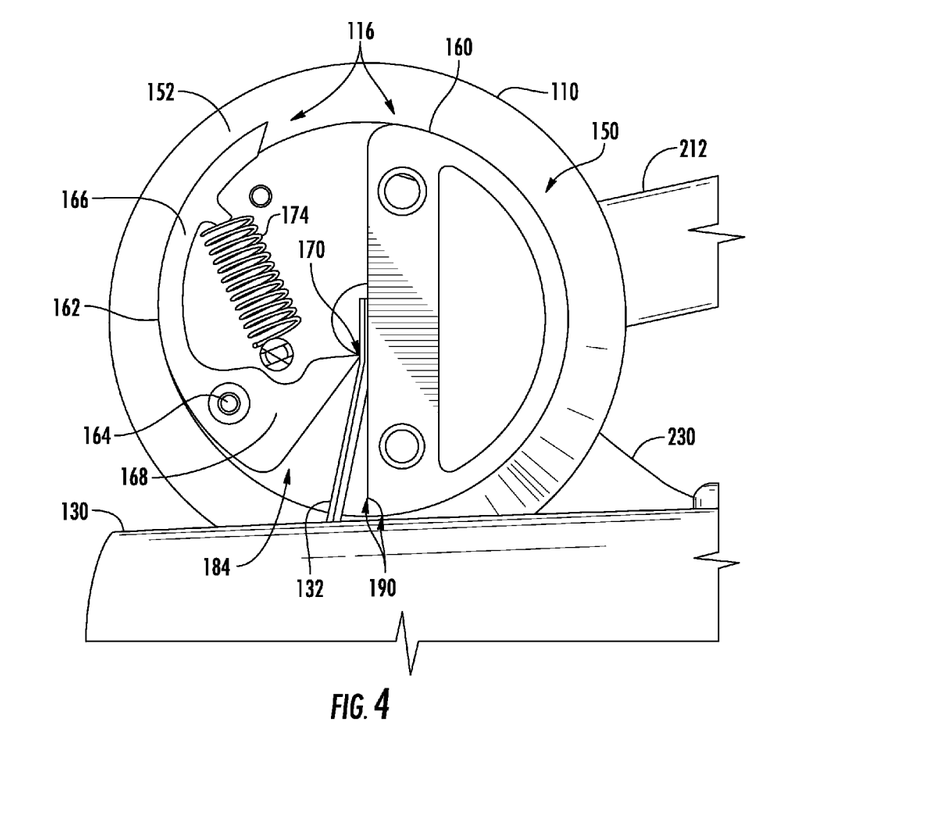
FIG. 4 is a broken-away side view focused on the gripping assembly of the cable-ripping tool of FIG. 2, with a left side of a handle and a left side of a spool of the cable-ripping tool having been removed to expose the view illustrated in FIG. 4.

Referring to FIGS. 2-4, the tool (100) can be mounted on a cable (130), as illustrated, with the spool (110) resting on the cable (130) and the clamping assembly (112) extending from the spool (110) longitudinally along the cable (130), with the cable (130) passing through the clamping region (114). The cable (130) can be any of various types of cables, with one or more wires such as neutral wires (132) extending along the periphery of the cable (130). For example, the neutral wires (132) may be circumferentially spaced about the cable (130), with each neutral wire (132) spiraling about the cable. A jacket (134) of the cable can surround the neutral wires (132). The cable (130) may also include conducting wires (136) passing through the center of the cable (130) and insulation (138) between the neutral wires (132) and the conducting wires (136). The cable (130) may also include other features, such as one or more semiconducting layers inside and outside of the insulation (138).

II. Spool and Gripping Members

Figure 5:
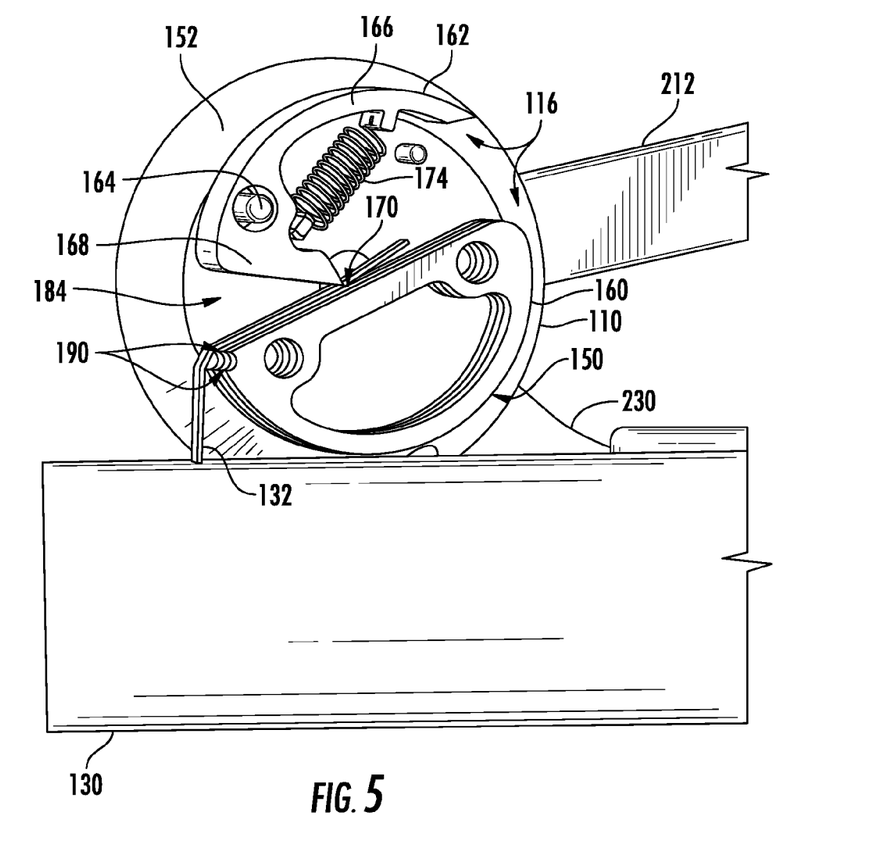
FIG. 5 is a view similar to FIG. 4, but from a perspective angle and showing a neutral wire starting to be wound onto the spool as the spool rotates.

Features of the tool (100) will now be described more particularly. The spool (110) can include a body (150) and a pair of opposing flanges (152). Referring particularly to FIGS. 4-5, at least a portion of the body (150) may be formed by the gripping members (116), while another portion of the body (150) may be a cylindrical member adjacent to the gripping members (116). The gripping member(s) (116) may include one fixed gripping member (160) that is fixed to the spool (110). For example, the fixed gripping member (160) can have a basic D-shape, with a flat side of the D extending along a diameter of the spool body (150) and a curved side of the D forming a part of the curved spool body (150).

The gripping member(s) may also include a moveable gripping member (162) that can move relative to the remainder of the spool (110). For example, the moveable gripping member (162) can rotate about a pivot (164). The moveable gripping member can have a curved biasing arm (166) extending in one direction from the pivot (164) and a gripping arm (168) extending in another direction from the pivot. The gripping arm (168) can extend from the pivot (164) to the straight side of the fixed gripping member (160) and terminate in a gripping edge (170). The curved biasing arm (166) can extend around to form part of the spool body on an opposite side from the curved portion of the fixed gripping member (160).

A spring (174) can bias the moveable gripping member (162) toward a gripping position, where the gripping edge (170) of the gripping arm pushes against the straight portion of the fixed gripping member (160). For example, the spring (174) can be a tension spring that is secured to the curved biasing arm (166), pulling the curved biasing arm (166) to bias the gripping edge (170) of the gripping arm (168) toward the fixed gripping member (160). The gripping arm (168) of the moveable gripping member (162) and the straight side of the fixed gripping member (162) can define a gripping aperture or gripping slot (184) between the gripping members (160 & 162). The gripping slot (184) can receive an end of a neutral wire (132).

When the neutral wire (132) is extended into the gripping slot (184) and past the gripping edge (170), the gripping edge (170) can be biased into engagement with the neutral wire (132), gripping the neutral wire between the gripping edge (170) and the straight portion of the fixed gripping member (160). A corner of the fixed gripping member at the opening of the gripping slot (184) can include one or more formed corners that define gripping edges (190). The edges (190) may point out of the gripping slot (184) in a circular shape, as illustrated in FIGS. 4-5. Alternatively, the edges (190) may point in some other direction, such as with multiple edges angling into the gripping slot (184) and toward the moveable gripping member (162). Such direction may allow the edges (190) to provide more griping force on a neutral wire (132) that is attempting to pull out of the gripping slot (184). When the neutral wire (132) being wound onto the spool (110) wraps around the gripping edges (190) on the fixed gripping member (160), the gripping edges can engage the neutral wire (132) to provide additional gripping force on the neutral wire (132) beyond what is provided by the gripping edge (170) of the moveable gripping member (162).

The gripping could be provided in some other manner. For example, the gripping could be done solely by properly positioned fixed gripping edges, although it may be more difficult to start a neutral wire winding on the spool with only fixed gripping edges. As another alternative, a moveable gripping member could be some other type of mechanism, such as a slider mechanism with a slider that travels along a path similar to a path traveled by the edge (170). The slider could be biased toward an inserted neutral wire by a spring.

Figure 6:
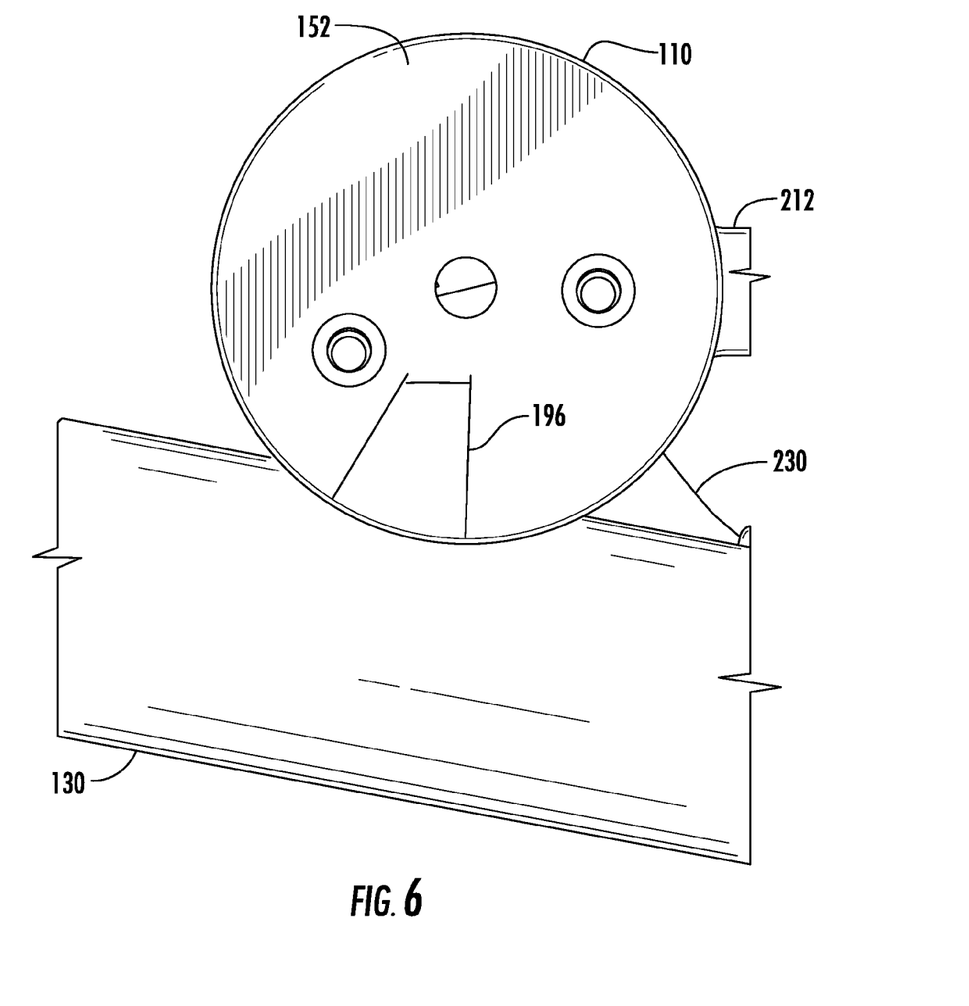
FIG. 6 is a broken-away side view similar to FIG. 4, but with the spool remaining in the view to illustrate an indicator on the spool.

Referring to FIG. 6, the spool can include an indicator that indicates a position of the gripping slot (184). For example, a visual indicator (196) can be positioned on an outer side of the spool (110), with the indicator (196) being aligned with the gripping slot (184). As an example, the visual indicator (196) may be a colored pattern on the spool (110), an engraved pattern on the spool (110), or some other type of indicator.

III. Driving Mechanism

Referring back to FIGS. 1-2, the driving mechanism (120) can be connected to the spool (110) so that the driving mechanism (120) can operate to rotate the spool (110) and wind a neutral wire (132) onto the spool (110). In one example that is illustrated, the driving mechanism (120) may be fixed to the spool (110). The driving mechanism (120) can include a ratchet mechanism (210) fixed to one side of the spool (110). The driving mechanism may also include a handle (212), which can form a U-shape with one leg secured to the ratchet mechanism (210) and another leg secured to a free-turning hub (214). The free-turning hub (214) can be secured to a side of the spool (110) opposite the ratchet mechanism (210). For example, the ratchet mechanism may be a ratchet mechanism similar to those commonly found in ratchet wrenches. The free-turning hub (214) may be similar to the ratchet mechanism (210) but without engaged ratcheting components.

While using the tool (100), the ratchet mechanism (210) may be engaged, disengaged and/or reversed by a worker. With the ratchet mechanism (210) engaged, movement of the handle (212) back and forth can result in the spool (110) rotating in a forward direction to wind a neutral wire (132) onto the spool (110). With the ratchet mechanism (210) disengaged or reversed, the spool (110) can rotate in a reverse direction (i.e., rotated opposite the forward direction) to unwind a neutral wire (132) from the spool (110).

IV. Clamping Assembly

Referring to FIGS. 1-3, the clamping assembly (112) will be discussed. The clamping assembly (112) can include a clamp arm (230) that extends from one side of the spool (110) along the cable (130) when the tool (100) is seated on the cable (130). A guide plate (232) can extend over the cable (130) from an end of the clamp arm (230) distal from the spool (110). Additionally, a shaft (234) can extend through a block (235) secured to the clamp arm (230) and under the cable (130). A wheel (236) can be seated on the shaft (234) under the cable (130). The wheel (236) can have flanges on opposing sides that extend up and around a bottom portion of the cable (130). The shaft can also extend up from the block (235) to support a clamp knob (238) on an upper end of the shaft (234). A compression spring (240) can be seated around the shaft (234) between the clamp arm (230) and the clamp knob (238). Thus, the compression spring (240) can bias the clamp knob (238), the shaft (234), and the wheel (236) upward, so that the wheel (236) is biased toward the guide plate (232). Accordingly, the clamping assembly (112) can produce a clamping force to clamp the cable (130) in the clamping region (114) between the wheel (236) and the guide plate (232).

Figure 7:
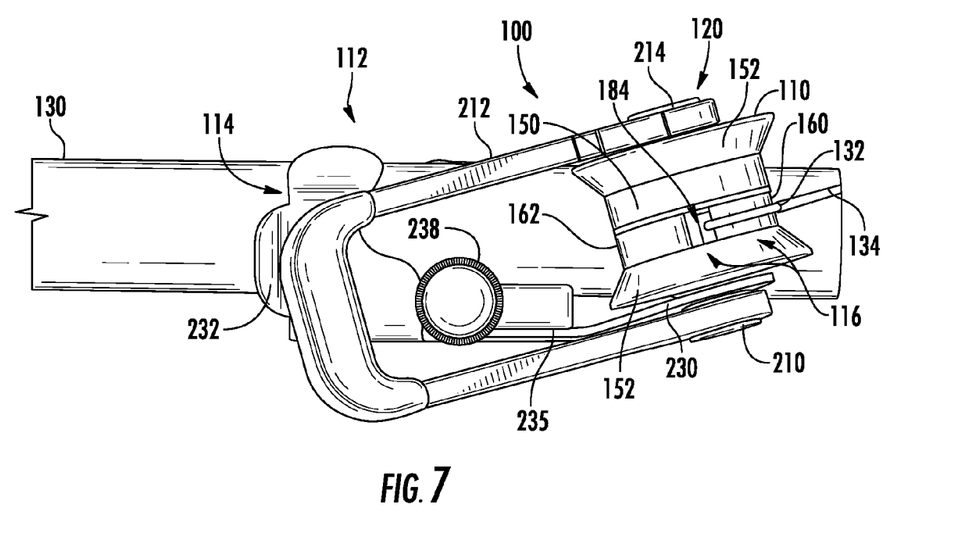
FIG. 7 is a top view of the cable-ripping tool of FIG. 2, showing the neutral wire starting to be wound onto the spool as in FIG. 5.

As can be seen best in FIG. 7, the clamping region (114) can be centered along a line extending from the spool (110) at an angle less than ninety degrees relative to a longitudinal axis of the spool. Accordingly, the clamp arm (230) can extend from the spool (110) at an angle, which can also be an angle less than ninety degrees. This can be done so that with the spool (110) resting on the cable (130) that passes through the clamping region (114), the spool (110) can be at an angle relative to the cable (130). This angle of the spool (110) can be such that the spool (110) is aligned with a spiraling angle of a typical neutral wire (132). For example, the spool (110) may be at an angle of about fifteen degrees relative to a longitudinal axis of the cable (130). Accordingly, the clamping region (114) may be centered along a line that extends from the spool (110) at an angle of about fifteen degrees relative to a radius of the spool (110). This orientation of the spool (110) can allow the neutral wire (132) to be more easily ripped through the jacket (134) of the cable (130) and wound onto the spool (110). A V-shaped, U-shaped, or other shaped clamping member that contacts the cable (130) in two or more points or lines of contact and/or one or more entire surfaces of contact may be used in place of the wheel (236) and/or the guide plate (232). Whether the wheel (236), guide plate (232), and/or some other clamping members are used in the clamping assembly (112), the clamping assembly (112) can contribute to alignment, stabilization and guiding of the tool (100) with respect to the cable, as the tool (100) moves in a spiral motion along the cable (130).

V. Materials and Manufacturing

The components of the tool (100) can be made from standard materials using standard manufacturing processes. For example, the handle (212) may be constructed of a metal such as tool steel. The handle (212) may be formed as a unitary member. Alternatively, opposite sides of the handle may be joined by a bar that can be connected to the two sides, such as by bolting or welding. The body (150) of the spool (110) (excluding the gripping members (116)) can be formed of a lightweight rigid material, such as aluminum or the material sold under the trademark Delrin® by DuPont. This portion of the spool body (150) can be formed in any of various ways, such as by machining (e.g., if aluminum is used) or by molding (e.g., if a Delrin® material is used). A steel part hub part can be connected to the spool and fit inside the ratchet mechanism (210) to connect the spool (110) to the ratchet mechanism (210). The gripping members (116) can be made of a hard material such as high carbon steel. The clamp arm (230) and guide plate (232) may be formed of sheet metal, such as aluminum or steel. The shaft (234) in the clamping assembly (112) can be made of a hard metal, such as stainless steel. The shaft (234) may have features machined into it, such as a groove that can keep the shaft (234) from rotating relative to the clamp arm (230). The wheel (236) in the clamping assembly (112) can be made of a polymer material, and can be formed in a standard way, such as machining or molding. Many metal parts of the tool (100), including the shaft (234), can include plated coverings. For example, some steel parts may include electrolysis nickel plating, which can also have some lubricating properties. While some examples of materials and manufacturing processes have been provided here, other different materials and manufacturing processes may be used. Also, the parts of the tool (100) can be sized to work for various sizes of cables (130). Additionally, a single tool (100) can be used for different cable sizes. For example, in some embodiments, the cable diameters can range from about 1⅞ inches to about 3 inches.

Other parts may also be included where the different components of the tool (100) connect. For example, a bearing bushing may be included where the clamp arm connects to the spool (110) and ratchet mechanism (210). Additionally, a friction member may be included between the clamp arm (230) and the spool (110) to hold the spool (110) in place when the handle (212) is ratcheted back after having been moved forward to drive rotation of the spool (110).

VI. Use of the Cable-Ripping Tool

Use of the cable-ripping tool (100) will now be described. A cable (130) can be prepared for use with the tool (100) by gripping one of the neutral wires (132) on an end of the cable (130) with pliers and pulling the neutral wire (132) through the jacket (134), so that a portion of the neutral wire (132) is extending roughly perpendicular to the cable (130). For example, about 1¼ inch to about 2 inches of the neutral wire (132) may extend away from the cable (130) in this manner.

A worker can pick up the tool (100) by the handle (212) with the worker's right hand, having the thumb on the left of the handle (212) and the fingers on the right of the handle. While holding the tool (100) in this manner, the clamp knob (238) can be pressed against the palm of the right hand. The worker can place the tool (100) over the neutral wire, just inside the guide plate (232), so that the neutral wire is protruding up between the guide plate (232) and the spool (110). The worker can then press down on the knob (238), which can press the guide plate (232) against the cable (130). The worker can continue to press down on the knob (238) to compress the spring (240). With the compression spring (240) being compressed, the worker can pivot the spool (110) up away from the cable (130) and slide the overall tool (100) along the cable until the spool (110) is directly over the protruding neutral wire (132), with the gripping slot (184) aligned with the neutral wire (132). This can be seen by the indicator (196) on the spool (110) aligning with the neutral wire (132).

The worker can press the spool (110) down over the neutral wire (132) until the spool (110) rests on the cable (130), as illustrated in FIG. 4. During this motion, the neutral wire (132) extends into the gripping slot (184) and is gripped between the fixed gripping member (160) and the gripping edge (170) of the moveable gripping member (162). The gripping edge (170) can be biased against the neutral wire (132) to grip the neutral wire (132) in the gripping slot (184).

The worker can release the clamp knob (238). When the clamp knob (238) is released by the worker, the clamping members, including the guide plate (232) and the wheel (236) are biased together by the compression spring (240) to clamp onto the cable (130) in the clamping region (114).

With the tool (100) in the resulting position, as illustrated in FIG. 2, the worker can rotate the handle (212) back and forth to actuate the ratchet mechanism (210). This results in the spool (110) being rotated relative to the clamping assembly (112) and the cable (130), which rips the neutral wire (132) through the jacket (134) of the cable (130) and winds the neutral wire (132) onto the spool (110).

Figure 8:
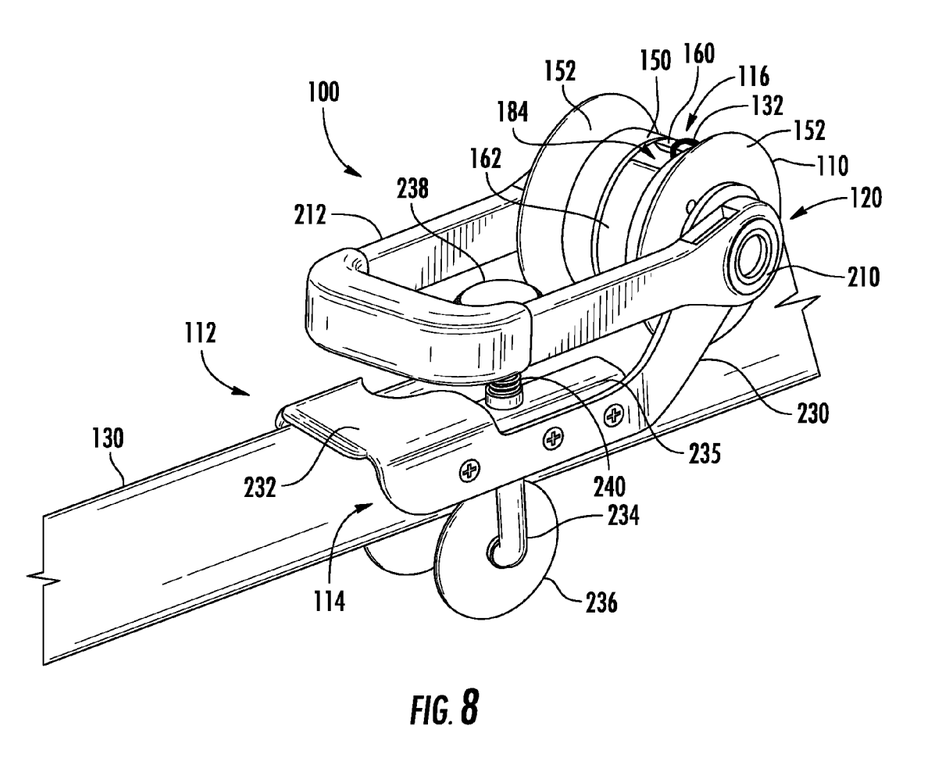
FIG. 8 is a front perspective view of the cable-ripping tool of FIG. 7.

As illustrated in FIG. 5, as the spool (110) begins to rotate, the two gripping edges (190) of the fixed gripping member (160) can grip the neutral wire (132). This can help to distribute the force on the neutral wire (132) between the points of contact with the different gripping edges (170 and 190), which may help to hinder breakage of the neutral wire (132) during ripping. FIGS. 7 and 8 illustrate the tool (100) beginning to wind the neutral wire (132) onto the spool (110).

The worker can continue to move the handle (212) back and forth to wind more neutral wire (132) onto the spool (110) until a sufficient length of the neutral wire (132) has been ripped through the jacket (134). For example, a length of between two and four feet of neutral wire (132) may be wound onto the spool (110). The worker can then take the ratchet mechanism (210) out of a forward driving configuration and reverse or release the ratchet mechanism (210), such as by flipping a lever (not shown) on the ratchet mechanism (210). The worker can grasp the tool (100), depress the clamp knob (238) (as noted above), and pull the tool (100) away from the cable (130). As the worker does so, the spool (110) can rotate so that the neutral wire (132) unwinds from the spool (110). The worker may release the wire from gripping slot (184) by depressing the curved biasing arm (166) so that the gripping arm (168) is rotated out of the gripping position—away from the neutral wire (132) and the fixed gripping member (160). The worker can then re-engage the ratchet mechanism (210) (e.g., by flipping the lever back) so that the tool (100) is again ready for use.

VII. Tool with Alternative Gripping Mechanism

Referring now to FIGS. 9-12, an alternative gripping mechanism (305) will be discussed. The gripping mechanism (305) can be connected to a spool (310). The spool (310) can include a body (312) that includes an arcuate plate (314) extending between two flanges (316). The other components of the cable-ripping tool can be the same as in the tool (100) discussed above.

The gripping mechanism (305) can include a moveable gripping member (320) that is attached to the spool (310) at a pivot (322). The gripping member (320) can be curved so that the gripping member (320) can act as a part of the body (312) of the spool (310) when the gripping member (320) is in a retracted position illustrated in FIGS. 10 and 12. Accordingly, the arcuate plate (314) and the gripping member (320) can form the body (312) of the spool (310).

Figure 9:
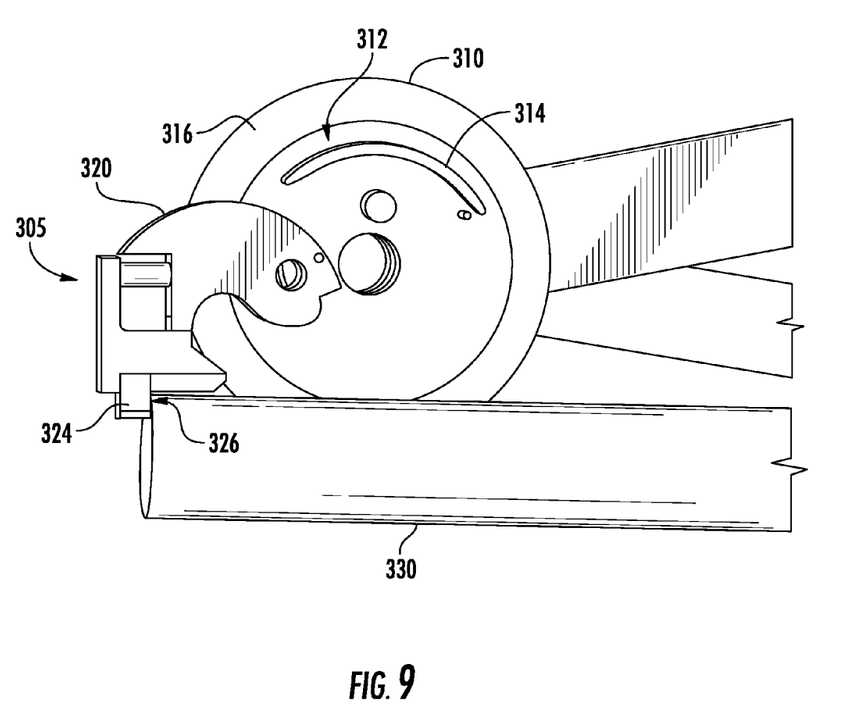
FIG. 9 is a broken-away side view of a spool, gripping assembly, and cable similar to FIG. 4, but illustrating an alternative gripping assembly.
Figure 10:
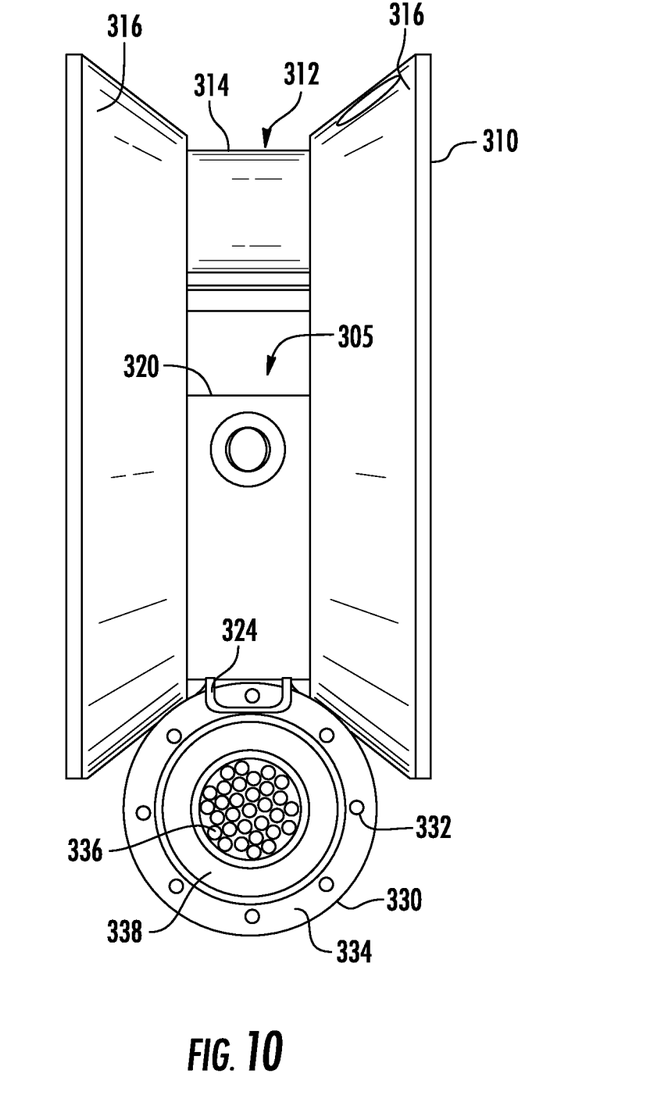
FIG. 10 is a front view of the spool, gripping assembly, and cable of FIG. 9.
Figure 11:
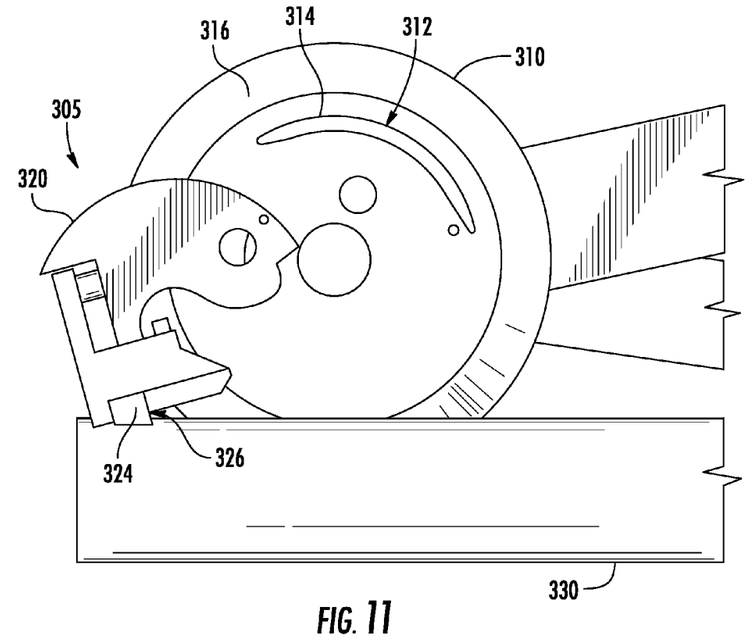
FIG. 11 is a side view similar to FIG. 9, but showing a cutter of the gripping assembly cutting through a jacket of the cable.

The moveable gripping member (320) can include a cutter (324), which can be a generally U-shaped blade having an edge (326). FIGS. 9-12 illustrate the spool (310) with the moveable gripping member (320) mounted on a cable (330) having neutral wires (332), a jacket (334), conducting wires (336), and insulation (338), as with the cable (130) discussed above. With the moveable gripping member (320) in the extended position illustrated in FIGS. 9-10, the edge (326) can be positioned to extend down and around a neutral wire (332) while facing into the jacket (334) of the cable (330), as illustrated in FIGS. 9-10.

Figure 12:
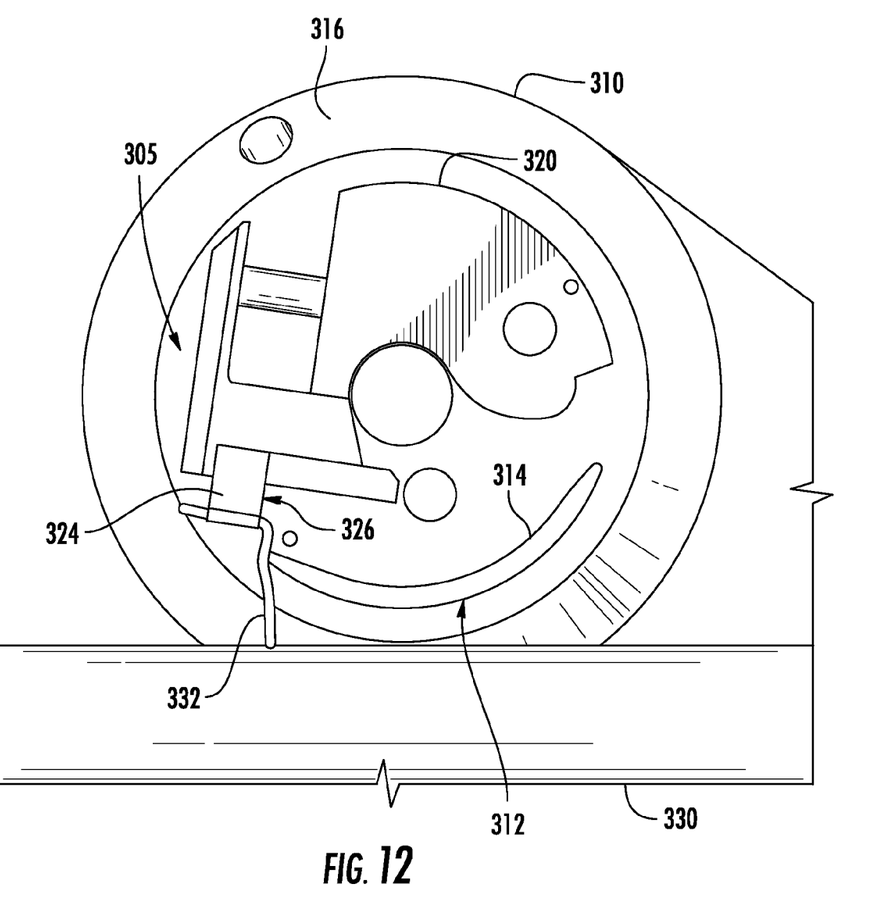
FIG. 12 is a broken-away side view similar to FIG. 11, but showing a neutral wire being lifted from the cable with the cutter of the gripping assembly.

The tool that includes the spool (310) can be clamped onto the cable (330) in the same manner as the clamping of the tool (100) discussed above. The moveable gripping member (320) can be biased into the extended position of FIGS. 9-10 with a spring (not shown). A worker can rotate the spool to position the blade edge (326) of the cutter (324) against the end of the cable (330), with the blade edge (326) extending around a neutral wire (332). A worker can tap firmly on the moveable gripping member (320) to drive the edge (326) of the cutter (324) into the jacket (334) of the cable (330) (see FIG. 11), capturing an end of the neutral wire (332) within the cutter (324). For example, the worker may tap on the moveable gripping member (320) with pliers, a small hammer, a wrench, etc. A worker can then rotate the spool (310) using the tool's driving mechanism (not shown), as discussed above. As the spool (310) rotates, the cutter (324) can crimp the neutral wire (332) and begin to rip the neutral wire (332) out of the cable (330). As illustrated in FIG. 12, as the spool (310) continues to be rotated, the cutter can bend the neutral wire (332), securing the neutral wire (332) so it is held from slipping out of the cutter (324). As is also illustrated in FIG. 12, after about half a turn of the spool (310), while the cutter (324) continues to grip the neutral wire (332), the moveable gripping member (320) can be nested in a contracted position in the body of the spool (310). As the spool (310) continues turning farther, the neutral wire (332) is wound around the arcuate plate (314) and around the curved portion of the moveable gripping member (320). Once the neutral wire (332) has been ripped to a sufficient length, the ratchet direction can be reversed or the ratchet mechanism can be disengaged, and the neutral wire (332) can be pulled off the spool (310).

While the invention has been particularly shown and described with reference to preferred embodiments thereof, it will be understood by those skilled in the art that various changes in form and details may be made therein without departing from the spirit and scope of the invention.

I claim:

1. A method of ripping a wire from a cable, the method comprising:
    clamping a cable-ripping tool onto a cable;
    gripping a portion of a wire from the cable with a gripping member of the cable-ripping tool, the gripping comprising moving the gripping member relative to a spool of the cable-ripping tool, wherein the gripping of the wire comprises a spring biasing the gripping member into engagement with the portion of the wire; and
    applying a force to rotate the spool so that the wire rips through a jacket of the cable and winds onto the spool, wherein the gripping of the wire occurs prior to the application of the force to rotate the spool.

2. The method of claim 1, wherein the gripping comprises the spring biasing the gripping member into engagement with the portion of the wire within a gripping aperture in the spool.

3. The method of claim 2, wherein the portion of the wire is a first portion of the wire and wherein the gripping comprises engaging a second portion of the wire with an edge at an opening of the gripping aperture, the second portion of the wire being a different portion from the first portion of the wire.

4. The method of claim 3, wherein rotating the spool comprises actuating a ratchet mechanism attached to the spool.

5. The method of claim 4, wherein the clamping comprises clamping the tool onto the cable with the spool mounted on the cable so that the spool is oriented with an axis of the spool at an angle less than ninety degrees relative to a longitudinal axis of the cable.

6. The method of claim 1, wherein the gripping comprises engaging the wire with multiple edges.

7. The method of claim 1, wherein the applying the force to rotate of the spool comprises actuating a ratchet mechanism attached to the spool.

8. The method of claim 1, wherein the clamping comprises clamping the tool onto the cable with the spool mounted on the cable so that the spool is oriented with an axis of the spool at an angle less than ninety degrees relative to a longitudinal axis of the cable.

9. The method of claim 1, wherein the gripping member comprises a gripping arm that rotates about an axis, and wherein the gripping of the wire comprises the spring biasing the gripping arm to rotate about the axis and toward the portion of the wire so that a portion of the gripping arm contacts the portion of the wire.

10. The method of claim 1, wherein the gripping of the wire comprises bringing the wire together with the cable ripping tool so that the portion of the wire is gripped by a portion of the gripping member and the wire extends in a first direction from the portion of the gripping member and toward a body of the cable.

11. The method of claim 10, wherein the cable ripping tool is configured such that with the wire gripped by the gripping member, biasing the portion of the gripping member in the first direction biases the portion of the gripping member toward the portion of the wire.

12. The method of claim 10, wherein the gripping of the wire comprises a gripping point of a gripping arm, which rotates around an axis, contacting the wire and biasing the wire against an opposing surface of the tool, and wherein a portion of a line extending perpendicular to the opposing surface and through the gripping point is located in a direction opposite to the first direction from the axis.

13. The method of claim 12, wherein the gripping of the wire comprises a gripping point of a gripping arm, which rotates around an axis, contacting the wire, wherein the cable ripping tool is configured such that with the wire gripped by the gripping arm, biasing the gripping point in a direction opposite to the first direction biases the gripping point toward the portion of the wire.

14. The method of claim 1, wherein the gripping of the wire comprises the spring biasing at least a portion of the gripping member to slide toward the portion of the wire.

15. The method of claim 1, wherein the gripping member further comprises a biasing arm, and wherein the method further comprises manually moving the biasing arm to release the gripping member from the wire.

16. A method of ripping a wire from a cable, the method comprising:
   clamping a cable-ripping tool onto a cable;
   gripping a portion of a wire from the cable with a gripping member of the cable-ripping tool, the gripping comprising moving the gripping member relative to a spool of the cable-ripping tool, wherein:
      the gripping of the portion of the wire comprises a spring biasing a gripping edge of the gripping member into engagement with portion of the wire within a gripping aperture in the spool; and
      the cable ripping tool is configured such that with the wire gripped by the gripping member, the wire extends from the gripping edge in a first direction relative to adjacent portions of the cable ripping tool toward a body of the cable, and biasing the gripping edge relative to one or more adjacent portions of the cable ripping tool in the first direction also biases the gripping edge toward the portion of the wire; and
   rotating the spool so that the wire rips through a jacket of the cable and winds onto the spool.

17. The method of claim 16, wherein rotating the spool comprises actuating a ratchet mechanism attached to the spool.

18. The method of claim 16, wherein the clamping comprises clamping the tool onto the cable with the spool mounted on the cable so that the spool is oriented with an axis of the spool at an angle less than ninety degrees relative to a longitudinal axis of the cable.

19. The method of claim 16, wherein the clamping comprises clamping the tool onto the cable with the spool mounted on the cable so that the spool is oriented with an axis of the spool at an angle less than ninety degrees relative to a longitudinal axis of the cable.

20. A method of ripping a wire from a cable, the method comprising:
   clamping a cable-ripping tool onto a cable;
   gripping a portion of a wire from the cable, the gripping comprising:
      gripping a first part of the portion of the wire with a gripping member of the cable-ripping tool, the gripping of the first part comprising moving the gripping member relative to a spool of the cable-ripping tool, wherein the gripping of the first part of the wire comprises a spring biasing a gripping edge of the gripping member to rotate about a pivot and into engagement with a first part of the portion of the wire within a gripping aperture in the spool, wherein the gripping of the first part of the wire comprises bringing the wire together with the cable ripping tool so that the wire extends into a portion of the tool in a first direction relative to the tool, and wherein the cable ripping tool is configured such that with the wire gripped by the gripping member, applying a force to the gripping edge in a direction opposite to the first direction biases the gripping edge toward the first part of the portion of the wire; and
      gripping a second part of the portion of the wire, with an edge at an opening of the gripping aperture, the second part of the wire being a different part from the first part of the wire; and
   rotating the spool so that the wire rips through a jacket of the cable and winds onto the spool; and
   moving a biasing arm of the gripping member to oppose the biasing of the spring and release the gripping member from the wire.

* * * * *